United States Patent [19]

Eastman et al.

[11] Patent Number: 4,633,814
[45] Date of Patent: Jan. 6, 1987

[54] FLOATING CALF FEEDER FOR FEEDING CALVES

[75] Inventors: Winthrop A. Eastman, Wayzata; John A. Gale, Minneapolis, both of Minn.

[73] Assignee: Mobion, Inc., Wayzata, Minn.

[21] Appl. No.: 821,256

[22] Filed: Jan. 22, 1986

[51] Int. Cl.⁴ ............................................. A01K 9/00
[52] U.S. Cl. ..................................................... 119/71
[58] Field of Search .......................................... 119/71

[56] References Cited

U.S. PATENT DOCUMENTS

| | | | |
|---|---|---|---|
| 336,225 | 2/1886 | Funk | 119/71 |
| 921,231 | 5/1909 | Goldman | 119/71 |
| 1,198,917 | 9/1916 | Heise | 119/71 |
| 1,891,575 | 12/1932 | Pittson | 119/71 |
| 2,607,319 | 8/1952 | Shappee | 119/71 |

Primary Examiner—Hugh R. Chamblee
Attorney, Agent, or Firm—Robert W. Doyle

[57] ABSTRACT

A calf feeder device adapted to float in a pail or the like of cow's milk, liquid feed, milk supplement or milk replacer. The calf feeder floats partially submerged in the milk with the nipple projecting generally upwardly and continuously filled with milk. Accordingly, a calf confronting such pail of feed may select between sucking the nipple or drinking the milk alongside the nipple and above the partially submerged floating calf feeder. Through the use of the floating calf feeder, a calf may be fed liquid feed supplement a short time after birth and after ingesting sufficient colostrum which is contained in its mother's milk through the natural process of sucking its mother's nipple or teat. The calf feeder includes a float ring, a nipple member detachably secured to such float ring and projecting upwardly therefrom and a valve means detachably secured to said float ring and interposed between said nipple and milk contained in a pail, said valve means in fluid communication with said nipple and said milk whereby said nipple is continuously filled with milk after a calf begins to suck thereupon. Accordingly, in a commercial setting, a calf may be switched from feeding on its mother to feeding on a liquid feed supplement by allowing the calf to suck the upwardly projecting nipple and then, more conveniently, the calf may abandon the upwardly projecting nipple and drink directly the milk which the calf confronts during the sucking process. This allows the calf's mother to return to the commercial production of milk while the calf enjoys controlled and balanced nutrition.

16 Claims, 6 Drawing Figures

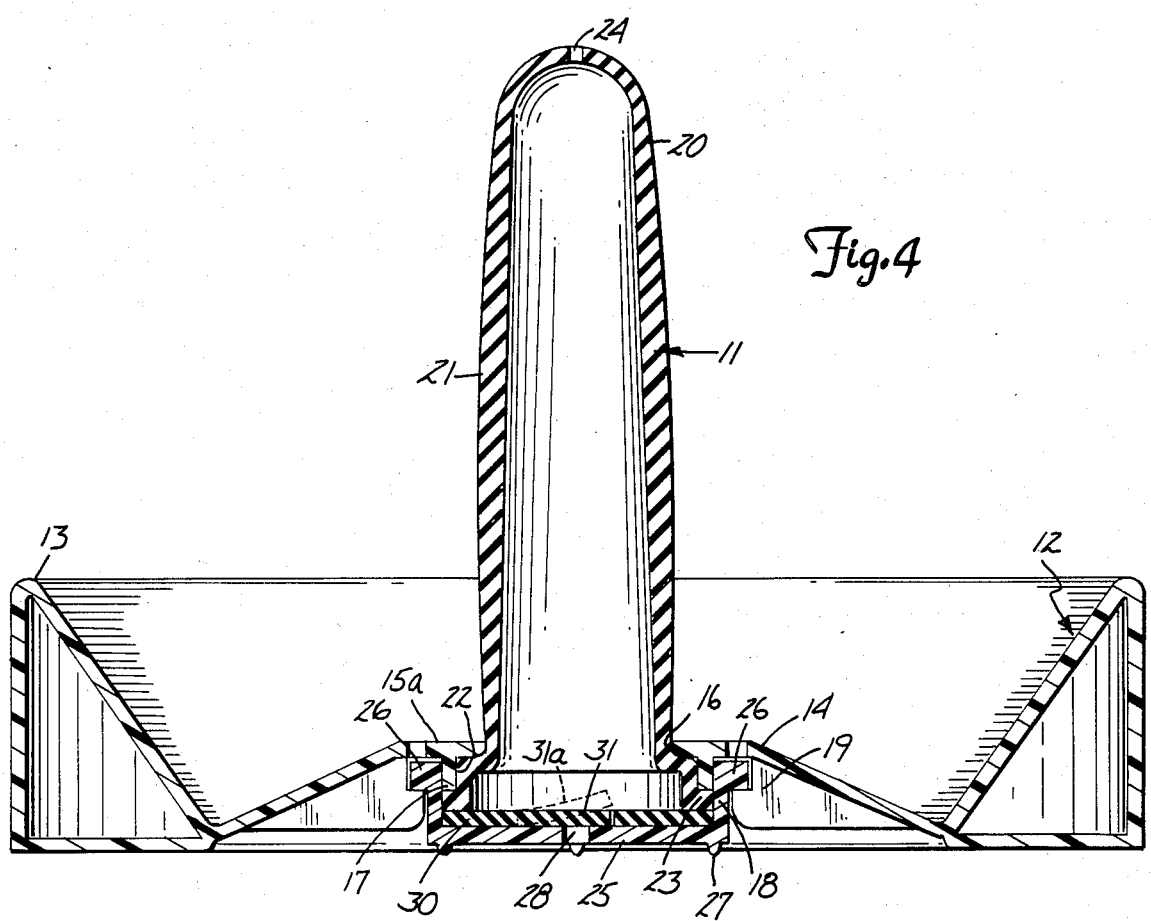

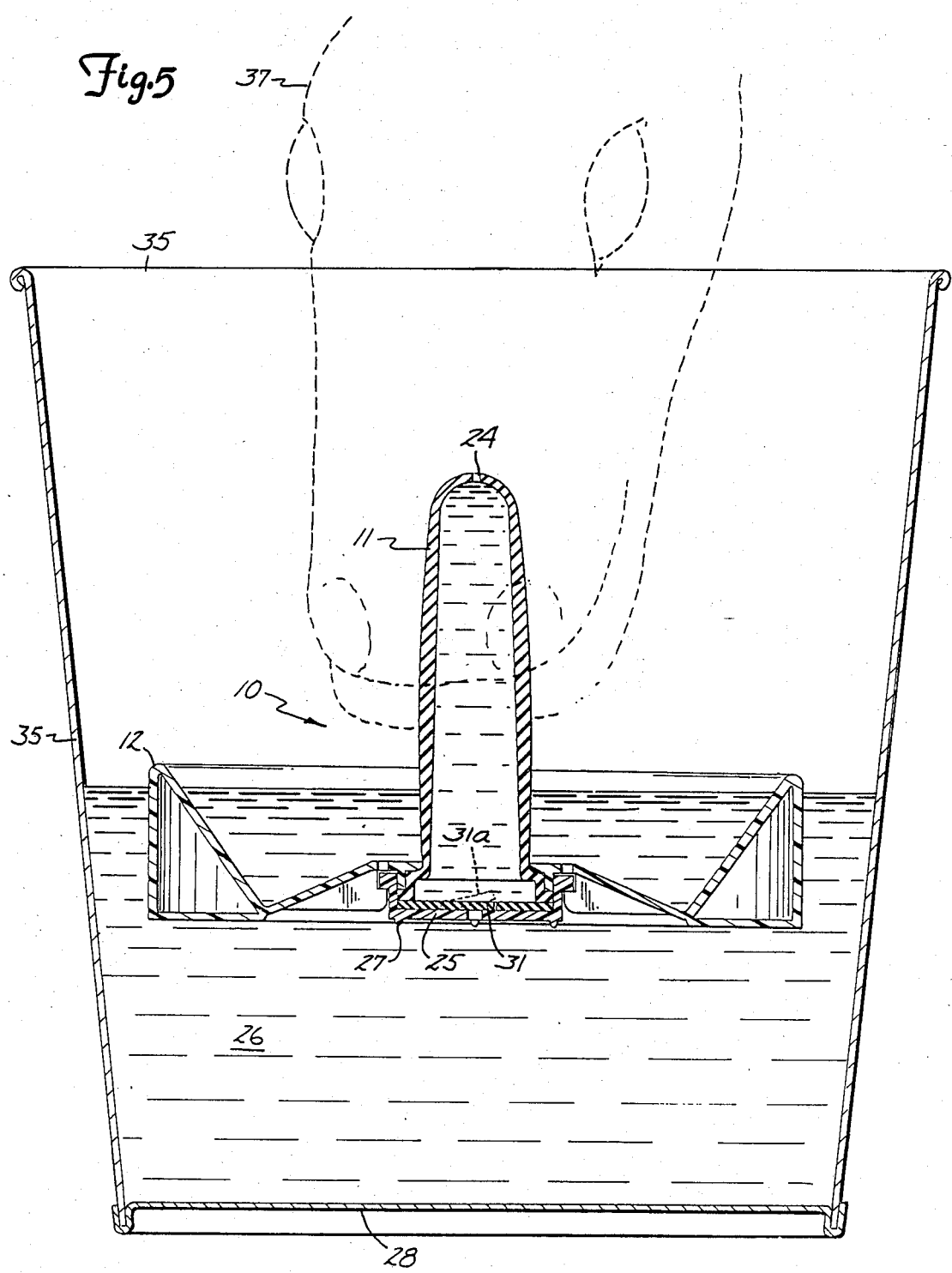

FLOATING CALF FEEDER FOR FEEDING CALVES

FIELD OF THE INVENTION

This invention relates to the art of calf feeding or weaning devices and the like and, in particular, relates to a floating calf feeder adapted to float partially submerged in a pail of cow's milk, liquid feed, milk supplement or a milk replacer. The floating calf feeder includes a float ring which floats partially submerged in a pail of milk with a nipple projecting upwardly therefrom. Valve means interposed between said nipple and milk in the pail causes said nipple to remain continuously filled with milk after the sucking process begins. Accordingly, a calf confronting a pail of milk in which said floating calf feeder is placed may select between sucking the nipple or drinking milk directly from the pool adjacent to said nipple covering the partially submerged float ring. In this manner, a calf may suck in a natural manner until it realizes that directly drinking the milk alongside is a more effective means to receive nourishment. Accordingly, the calf is weaned from its mother in a cost effective manner, allowing its mother to return to commerical production of milk without detrimental effect on the health of its calf.

BACKGROUND OF THE INVENTION

It is a well known and universally experienced problem in the dairy and veal industries that a percentage of calves cannot make an easy transition from feeding off of their mother's teat to drinking from a pail.

It is common practice in the veal and dairy industries to take the calf from the mother as soon as possible, generally just a few days after birth. The calf needs to feed on its mother's milk only long enough to ingest enough colostrum contained in its mother's milk to receive natural antibodies necessary to protect the calf from disease and other maladys. The primary reason to start calves on pail feeding is that the milk replacer that is used as feed is equally or more nutritious than the mother's milk and it is economically advantageous for the farmer to get his cows back into milk production as soon as possible rather than to use them only as a food source for their calves.

The problem of what to do with the calves that will not drink directly from a pail has been around for a long time and many solutions have been tried. A common method is for the farmer to let the calf suck on his thumb and while the calf is sucking, to draw the calf's head down into the bucket so that the calf begins to get some milk from the pail. The farmer then withdraws his hand hoping the calf will begin to drink from the pail without the surrogate teat. In many cases, this procedure must be repeated until the calf learns to drink the liquid from the pail. This is not a practical method in a commercial operation.

Many artificial teat devices are in use. One device is a special pail that has a nipple attached to the outside bottom of the pail. The pail is suspended level with the head of the calf and the calf drains the pail by sucking on the nipple.

Another device is a solid nipple that attaches with a suction cup to the inside bottom of a pail. The solid nipple projects upwardly towards the top of the pail and serves as an object for the calf to suck on. The calf sucks on the nipple but receives no liquid feed due to the solid construction of the nipple. As the calf becomes frustrated with the nipple he may abandon it and drink directly from the pail. This device can become detached easily from the bottom of the pail and there is a risk of the calf sucking the nipple into its throat and choking.

Another common method is a large, plastic bottle removably mounted in a frame that can be attached on the side of a calf stall or in front of a calf crate. The bottle has a gravity fed nipple on its open end, and is mounted with the nipple projecting downwardly. The calf sucks on the nipple and drains the contents of the bottle. This method has the limitation of only being able to provide a fixed volume of milk replacer. It is also necessary for air to replace the space in the bottle as the milk replacer is drained.

Another known device is a nipple which floats, but which does not afford a choice of sucking or drinking to the calf being weaned and which device, further, floats in an unstable manner and does not allow full evacuation of the milk in the pail.

With all of the attached nipple devices, calves are known to pull the nipples off, risking the calf sucking the nipple into its throat and choking. Gravity fed nipples often leak creating unsightly and unsanitary conditions. The components are difficult to clean.

Much larger, automatic feeding systems are sometimes employed. These systems can feed hundreds of calves at a time through a system of feeding tubes running from a central tank. These systems have many mechanical parts, present tremendous cleaning problems and do not allow the farmer to know which calves are drinking and which are not. It should be pointed out that a calf which does not consume its ration is often suffering from a physical problem.

It would thus be an improvement in the art to provide a floating calf feeder with an upwardly projecting nipple which is continuously filled with milk and which allows a calf to select between sucking the nipple or drinking milk alongside the nipple whereby the calf may be weaned from its mother in a cost effective manner and in a manner easy to monitor the feeding habits of the pertinent calf.

SUMMARY OF THE INVENTION

According to this invention, there is provided a floating calf feeder which can be used with a pail containing milk or milk replacer to wean a calf from its mother's teat after the calf has received the natural antibodies necessary to protect the calf from diseases, thereby allowing the calf's mother to return to the production of milk in a commercial operation. The calf confronts the pail of milk with the floating calf feeder positioned therein, with the nipple projecting upwardly in a manner convenient for sucking. As the calf advances on the nipple, the calf confronts milk surrounding the nipple, convenient for direct drinking.

The floating calf feeder comprises a nipple fabricated from natural rubber or the like, simulating a natural nipple or cow's teat. The nipple is detachably secured to a float ring, generally dish shaped and fabricated from plastic materials such as ABS or vinyl. A valve disk interposed between the milk and the nipple is detachably secured to the float ring and is fabricated from natural rubber or a similar resilient material utilizing a "flap" valve principle. A retaining cap having several positions secures said disk valve to the float ring and is typically fabricated of polyethylene plastic. The device is readily disassembled for cleaning and sterilization.

It is an object of this invention to provide a floating calf feeder for feeding calves which provides the calf with a choice between sucking or direct drinking as a means of obtaining nutrients.

Another object of this invention is to provide a floating calf feeder in which the nipple is continuously filled with milk after the sucking action starts so that the calf is not discouraged in the use of the artificial nipple.

Still another object of the invention is to provide a floating calf feeder for feeding calves which may be readily disassembled for cleaning and sterilization, such parts being generally free from grooves, undercuts and recesses.

Still another object of this invention is to provide a floating calf feeder for feeding calves which floats within a pail of milk and as the milk is either sucked through the floating calf feeder or directly drunk from around the floating calf feeder, the floating calf feeder descends with the liquid level in a manner that the pail may be emptied by the calf through either a sucking or drinking action.

Still another object of this invention is to provide a floating calf feeder which may float within a pail of milk or milk replacer and maintain stability during the sucking or drinking action of the calf.

Other and further objects of this invention will become apparent to those skilled in the art from the following detailed description of a preferred embodiment of this invention showing a best mode of the invention.

BRIEF DESCRIPTION OF THE DRAWINGS

FIG. 1 is an elevational view of the floating calf feeder.

FIG. 2 is a plan view of the floating calf feeder.

FIG. 4 is an enlarged, cross-sectional view of the floating calf feeder taken on approximately line 4—4 of FIG. 2.

FIG. 5 is a pictorial illustration showing the floating calf feeder in cross-section, placed in a pail of milk and further showing a calf in dotted lines sucking and another calf in dotted lines drinking.

DETAILED DESCRIPTION OF THE PREFERRED EMBODIMENT

Figure 3:
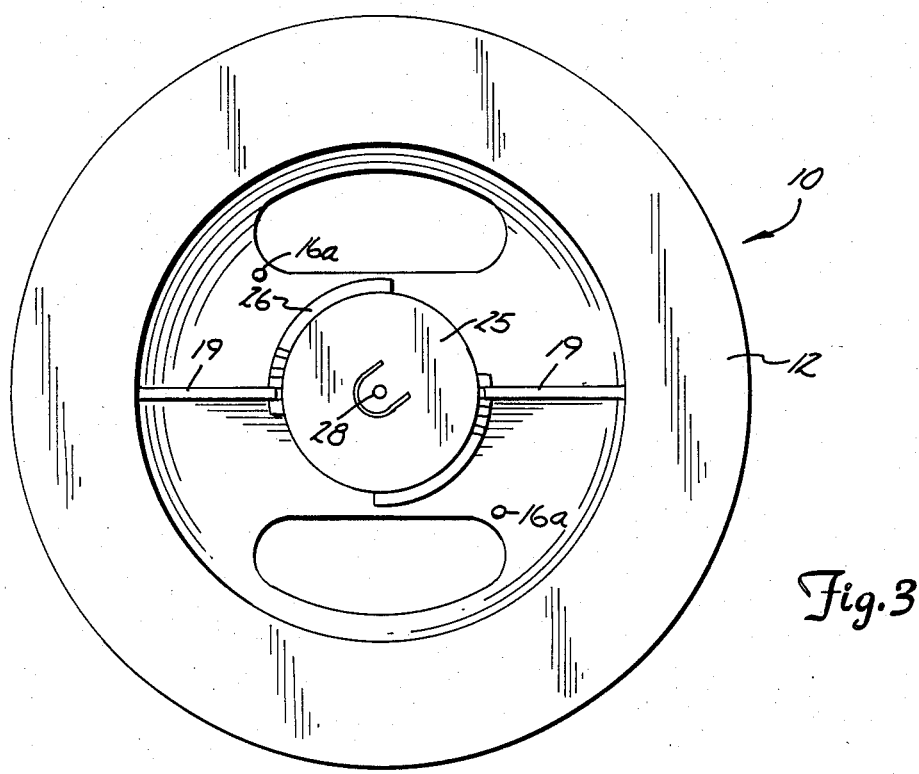
FIG. 3 is a bottom view of the floating calf feeder.
Figure 6:
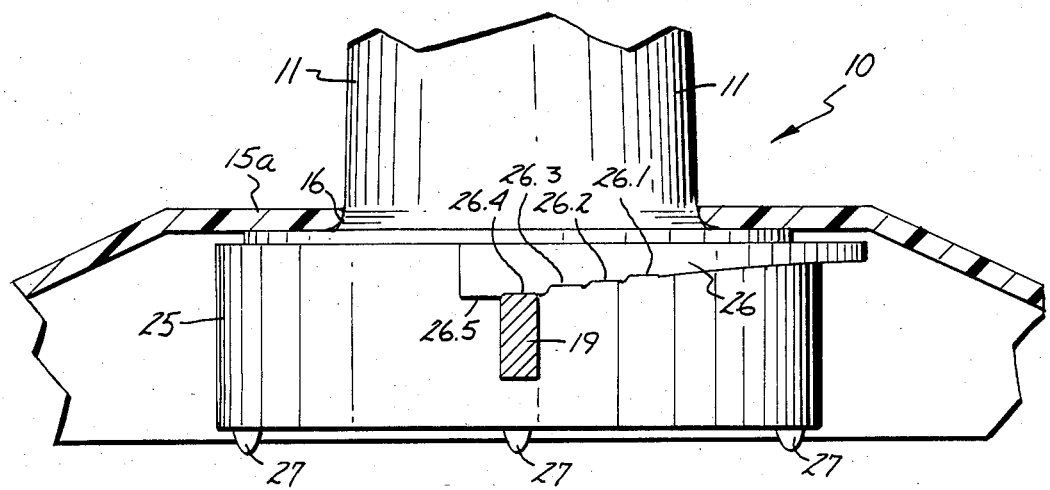
FIG. 6 is an enlarged view showing details of securing the feeding nipple with the cross plate.

Referring to the drawings, the floating calf feeder is shown generally as 10. The floating calf feeder 10 includes an upwardly projecting nipple 11 and float ring 12. The float ring 12 has a hollow outer ring section 13, essentially triangular in cross-section. A frusto conical cross plate 14 extends across the inner diameter of the float ring 12. Cross plate 14, further, has a pair of cutouts 15 opposite disposed therein and a central horizontal mounting plate 15a with a central nipple hole 16. Cross plate further has a means such as a hole 16a to which a cord, chain, clip, or the like may be fastened.

The bottom side of the mount 15a has an annular recess 17 extending outwardly from the nipple hole 16 and the lower seal surface 18. A plurality, preferably two retainer tabs 19 also extend downwardly from the cross plate 14. The float ring 12 may be formed from any suitable material, and is preferably made from ABS or Vinyl plastics. The float ring 12 may be formed using a suitable method such as blow molding, or injection molding in separate pieces that are later sealed together.

The nipple 11 is generally cylindrical in shape having a closed second end and an open first end and is formed from an elastomeric material preferably natural rubber or equivalent. The nipple 11 has a thin wall portion 20 at its top and traversing downwardly, the wall thickness increases to thick wall portion 21 of the nipple 11. Near the first end of the nipple 11 there is an outwardly extending shoulder 22 abutting the lower surface of the cross member 14 surrounding the nipple 16.

The first end of the nipple 11 terminates in a seal shoulder 23 extending outwardly over the lower surface of the cross member 14 surrounding the annular recess 17. The second end of the nipple 11 terminates in a hemispheric section having a feedhole 24 centrally located therein.

A cup shaped retaining valve cap 25 covers the first end of the nipple 11 and has outwardly extending ramped segments 26 cooperatively fitting under and retained by the retainer tabs 19. The ramped segments 26 each have a plurality, preferably four detented stops 26.1–26.4 formed on the ramped surface. The last most detent stop 26.4 is adjacent to twist stop 26.5 limiting the attachment rotation of the retaining valve cap 25. The retainer valve cap 25 has a plurality, preferably four, downwardly extending bottom spacers 27. A plurality, preferably two, grip tabs 27a extend outwardly from the periphery of the retainer valve cap 25. An inlet orifice 28 is centrally located in the retainer valve cap 25 for passage of fluids therethrough.

The valve disk 30 is a circular disk formed from an elastomeric material, preferably natural rubber or an equivalent synthetic. Valve disk 30 has a valve flap 31, hinged from the central portion and overlying the inlet orifice 28. The valve disk 30 is further interposed between the inner surface of the retainer valve cap 25 and the seal shoulder 23 on the first end of the nipple 11.

In its use, the floating calf feeder 10 is placed in containers such as a milk pail 35, as illustrated in FIG. 5. Sufficient quanity of a liquid feed 36 such as milk or a milk replacement is placed in the milk pail 35. The floating calf feeder 10 floats, partially submerged, on the liquid 36 presenting the upwardly extending nipple 11 to a calf 37, generally shown in dotted on FIG. 5, to suckle therefrom. The floating calf feeder 10, additionally is attached using a line or other suitable tethering means passing through the retainer hole 16a and therefrom attached to the pail 35 or a stall so that if the feeding calf removes the floating calf feeder 10 from the pail 35, the floating calf feeder 10 is retained in the feeding area.

When the calf 37, feeds by sucking on the nipple 11, the fluid 36 is drawn past the valve disk flap 31, through the nipple 11 and from the feed hole 24 and into the calve's mouth. As the calf continues to suck, the valve flap 31 of the valve disk is moved from its closed position to an open position, as illustrated in dotted 31a, allowing the liquid 36 to be drawn into the interior of the nipple 11 and thence, into the calf. As the liquid 36 is consumed by the calf, 37, the float ring, 12, descends in relation to the pail 35, thereby supplying the calf with a continuous supply of milk until the milk pail 35, is emptied completely.

With consumption of the liquid 36, the floating calf feeder 10 will approach the bottom of the milk pail 35. As the last portions of the liquid 36 are being withdrawn from the nipple 11, the bottom spacers 27 will contact the milk pail bottom 38 providing a space between the retainer valve cap 25 and the milk pail bottom 38, preventing a "seal" to occur between said milk pail bottom 38 and retaining cap 25 so that the liquid 36 may be drawn therethrough into the nipple 11.

As the calf 37 continues to suckle on the nipple 11, it will advance on the nipple 11 thereby contacting its nose with the liquid feed 36 and become accustomed to the wet sensations. As the calf continues to feed, it will learn that it can consume the liquid 36 more efficiently by placing its mouth directly into the liquid 36 and drinking the liquid 36 surrounding the nipple 11 as illustrated in the solid outline 39 in FIG. 5.

Should the calf 37 become overly aggressive sucking and pulling on the nipple 11 and pull back on the nipple 11, it can only remove the floating calf feeder 10 from the milk pail 35 and cannot pull the nipple from the float ring 12 to injure either itself or the nipple 11. The floating calf feeder 10 is attached using a cord passing through the retainer hole 16a to the pail 35 so as the calf may not remove the floating calf feeder 10 from the feeding area. Additionally, when feeding a calf using a suspended pail 35, a retaining cord attached to the retainer hole 16a may be suitably short so that should the calf remove the floating calf feeder 10 from the pail 35, it will not fall to the floor becoming soiled.

As the calf 39 becomes more and more accustomed to directly drinking the liquid 36 from the pail, the floating calf feeder 10 may be removed from the pail allowing the calf to feed only by directly drinking the liquid feed.

These advantages, usages and many other usages will be found and realized by those versed in the art, and although various minor modifications may be suggested and employed by those who are versed in the art, be it known that we wish to embody within the scope of the patent granted hereon all such embodiments as reasonably come within the scope of our contribution to the art.

What is claimed is:

1. A floating calf feeder for feeding calves comprising:
   (a) an annular float ring having a cross-plate extending across the central opening of the float ring and affixed near the first end of the float ring, the cross-plate further having a central nipple hole;
   (b) an elongate cylindrical nipple having outside dimensions at the first end to snuggly fit within the nipple hole, and further having a means for limiting travel into the nipple hole affixed at the first end; the nipple further having a second end of reducing cross-section terminating in a small orifice; and
   (c) a retainer valve cap having a means removably attaching the valve cap to the first end surface of the cross plate and extending over the first end of the nipple and the nipple hole; the retainer valve further having a valving means disposed therein allowing the one way passage of fluids into the nipple.

2. The floating calf feeder according to claim 1 wherein the means limiting incursion further comprises an increased diameter outwardly extending shoulder having a radial surface abutting the cross plate, thereby retaining the cross plate at the nipple first end.

3. The floating calf feeder according to claim 1 wherein the reducing cross-section nipple second end is essentially hemispheric.

4. The floating calf feeder according to claim 1 and the valve cap includes a plurality of outwardly extending finger grips.

5. The floating calf feeder according to claim 1 wherein the cross plate is a flattened frusto-conical segment having oppositely disposed cut-outs in the inclined surface.

6. The floating calf feeder according to claim 5 wherein the cut-outs cooperate with the float ring forming oval holes between the cross plate and the float ring.

7. The floating calf feeder according to claim 1 wherein the annular float ring is elongate.

8. The floating calf feeder according to claim 7 wherein the float ring has a triangular cross-section.

9. The floating calf feeder according to claim 8 wherein the float ring a the right angle at the junction of an outer surface and the first end.

10. The floating calf feeder according to claim 1 and the means removably attaching the valve cap is a plurality of outwardly extending ramped segments on the periphery of the valve cap and a corresponding plurality of cooperating overlying retainer tabs on the outer surface of the cross plate.

11. The floating calf feeder according to claim 10 wherein there are two ramped segments on the valve cap and two cooperating retainer tabs on the outer surface of the cross plate.

12. The floating calf feeder according to claim 11 wherein each ramped segment has four stop positions along the downwardly facing surface and a final end stop thereafter; whereby the rotatable retaining valve cap is retained on the one stop and its further rotation is prevented by the end stop.

13. The floating calf feeder according to claim 1 wherein the valving means comprises an inlet orifice communicating the fluid through a one-way valve in the retainer valve cap and further communicating the fluid to the nipple interior.

14. The floating calf feeder according to claim 13 wherein the one way valve is an elastomeric disk interposed abuttingly between the valve cap and the nipple first end having a movable flap disposed overlying the inlet orifice.

15. The floating calf feeder according to claim 14 and the valve cap further comprises a plurality of bottom spacers extending axially outward therefrom.

16. The floating calf feeder according to claim 15 wherein there are four bottom spacers.

* * * * *